(12) United States Patent
Hsu et al.

(10) Patent No.: US 8,133,961 B2
(45) Date of Patent: Mar. 13, 2012

(54) WATERBORNE COATINGS WITH IMPROVED EARLY WATER BLUSHING AND CHEMICAL RESISTANCE

(75) Inventors: Shui-Jen Raymond Hsu, Westlake, OH (US); Elizabeth Blankschaen, Broadview Heights, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 419 days.

(21) Appl. No.: 12/330,874

(22) Filed: Dec. 9, 2008

(65) Prior Publication Data

US 2009/0163619 A1 Jun. 25, 2009

Related U.S. Application Data

(60) Provisional application No. 61/015,423, filed on Dec. 20, 2007.

(51) Int. Cl.
*B32B 13/12* (2006.01)
*B32B 27/18* (2006.01)
*B32B 27/30* (2006.01)

(52) U.S. Cl. ........ 526/274; 526/277; 526/315; 526/316; 524/81; 524/547; 524/592; 524/807; 524/818

(58) Field of Classification Search .................. 526/274, 526/277, 315, 316; 524/81, 547, 592, 593, 524/807, 818
See application file for complete search history.

(56) References Cited

U.S. PATENT DOCUMENTS

| | | | |
|---|---|---|---|
| 4,267,091 A | 5/1981 | Geelhaar et al. | |
| 4,654,397 A | 3/1987 | Mueller-Mall et al. | |
| 4,959,428 A | 9/1990 | Abe et al. | |
| 5,332,854 A | 7/1994 | Yokota et al. | |
| 5,447,970 A | 9/1995 | Tomita et al. | |
| 5,472,996 A | 12/1995 | Hayashi et al. | |
| 5,928,783 A | 7/1999 | Phan et al. | |
| 6,117,936 A | 9/2000 | Kato et al. | |
| 6,239,240 B1 | 5/2001 | Schultz et al. | |
| 6,348,528 B1 | 2/2002 | Schlarb et al. | |
| 6,506,804 B2 | 1/2003 | Schultz | |
| 6,512,042 B1 | 1/2003 | Fischer et al. | |
| 6,515,042 B2 | 2/2003 | Kriessmann et al. | |
| 6,538,062 B2 | 3/2003 | Sakaguchi et al. | |
| 2005/0245662 A1 | 11/2005 | Chen et al. | |
| 2005/0256257 A1 * | 11/2005 | Betremieux et al. | 524/556 |

FOREIGN PATENT DOCUMENTS
FR 2867478 A 9/2005
WO 2004/029172 A1 4/2004

* cited by examiner

*Primary Examiner* — Kelechi Egwim
(74) *Attorney, Agent, or Firm* — Samuel B. Laferty

(57) ABSTRACT

This invention relates to waterborne coatings with enhanced early water blushing resistance, chemical resistance, and adhesion to substrates. These waterborne coatings can be paints, varnishes, and water sealers that offer excellent early water blushing as well as excellent resistance to common household chemicals, such as gasoline, motor oil, brake fluid, transmission fluid, household cleaners, window cleaning fluids, antifreeze, and the like.

18 Claims, No Drawings

WATERBORNE COATINGS WITH IMPROVED EARLY WATER BLUSHING AND CHEMICAL RESISTANCE

CROSS REFERENCE TO RELATED APPLICATION

This application claims the benefit of priority of U.S. Ser. No. 61/015,423 filed on Dec. 20, 2007.

FIELD OF INVENTION

Waterborne coatings having good, blush resistance and resistance to common household contaminants are described. The coatings comprise polymers from a) ethylenically unsaturated monomers phosphorus containing monomer, b) carbonyl containing monomer and crosslinking system, and either a phosphate surfactant and/or polymerizable surfactant.

BACKGROUND OF THE INVENTION

Waterborne coatings are commonly applied to a wide variety of substrates, such as wood, metal, masonry, plaster, stucco, and plastic. In many of these applications the coating, which is based, upon an emulsion polymer, is exposed to wet environments caused by rain, dew, snow and other sources of water. The coating is exposed to water for prolonged periods of time in some applications. However, waterborne coatings especially clear aqueous coatings, tend to blush or whiten when exposed to water. Some prior arts had addressed this issue by using self-crosslinking approaches.

U.S. Pat. No. 4,267,091 disclosed the use of carbonyl groups containing monomers, water soluble aliphatic dihydrazide and metal salts such as zinc salt to improve water whitening (blushing).

U.S. Pat. No. 4,959,428 disclosed the use of a water soluble carbonyl containing copolymer as polymeric dispersant to make emulsion polymers to enhance anti-whitening.

U.S. Pat. No. 4,654,397, U.S. Pat. No. 5,447,970, U.S. Pat. No. 5,472,996, U.S. Pat. No. 6,117,936, U.S. Pat. No. 6,512,042, U.S. Pat. No. 6,515,042 and U.S. Pat. No. 6,538,062 disclosed the polymers with carbonyl containing monomers to enhance coating properties.

Some prior arts also taught the approaches to reduce water-whitening; however, they are not suitable for coating applications.

U.S. Pat. No. 6,515,042 B2 and U.S. Patent 2005/0245662 A1 disclosed styrene containing emulsion polymers with polymerizable surfactants for improving water-whitening resistance of pressure sensitive adhesives.

WO 2004/029172 disclosed the use of monomers containing aldehyde or ketone groups and polymerizable surfactants to enhance water whitening resistance for removable pressure sensitive adhesives.

None of the prior arts addressed the issue of early water blushing or whitening resistance for coating applications. There is currently a need for waterborne varnishes and water sealers having good early water blushing resistance, such as after two to four hours of dry time under normal conditions, to sustain unexpected rain, sprinkler water, or swimming pool water. None of the prior arts taught the disclosed polymer compositions for early water blushing resistance.

Waterborne coatings also frequently offer poor resistance to chemicals that are commonly used in homes and offices, such as gasoline, motor oil, brake fluid, transmission fluid, household cleaners, window cleaning fluids, antifreeze, and the like. The prior arts mentioned above have taught the use of carbonyl containing monomers to enhance resistance to chemicals. It is also desirable for such waterborne coatings to offer good adhesion to typical substrates and a high level of resistance to common chemicals. Such waterborne coating compositions would be of particular value for utilization in painting masonry structures, such as concrete, tile, or brick surfaces.

SUMMARY OF THE INVENTION

This invention discloses a polymer that is of particular value for utilization in manufacturing waterborne coating formulations, such as varnishes, water sealers, and paints. The coatings made with these polymers offer excellent early water blushing and whitening resistance and are not prone to water spotting or blushing on exposure to water. They also offer excellent resistance to common household chemicals, such as gasoline, motor oil, brake fluid, transmission fluid, household cleaners, window cleaning fluids, antifreeze, and the like.

The polymers of this invention are of value for utilization in manufacturing coating compositions, such as paints or varnishes, for use on virtually any type of substrate including wood, metal, masonry, plaster, stucco, or plastic. By virtue of their high level of water resistance they are of particular value for use in making exterior paints, varnishes, and water sealers. They also have excellent characteristics for utilization in making coatings for masonry structures. For instance, the polymers of this invention are of particular value for use in making paints and water sealers for application to garage floors and concrete driveways. This is because they adhere well to concrete and are resistant to water, gasoline, motor oil, brake fluid, transmission fluid, antifreeze, and a wide variety of other chemicals that are commonly spilled onto garage floors and concrete driveways.

The present invention more specifically discloses a waterborne coating composition which is comprised of (1) water; (2) an emulsion polymer composition which is comprised of: (a) 0.5 weight percent to 15 weight percent of a carbonyl functionalized monomer, (b) 0.1 weight percent to 10 weight percent of a phosphorous containing monomer, and (c) 0.05 weight percent to 5 weight percent of a phosphate surfactant or a polymerizable surfactant; and (3) at least one coalescing aid.

The subject invention also reveals an emulsion polymer which is comprised of (a) 0.5 weight percent to 0.15 weight percent of a carbonyl functionalized monomer, (b) 0.1 weight percent to 10 weight percent of a phosphorous containing monomer, and (c) 0.05 weight percent to 5 weight percent of a phosphate surfactant or a polymerizable surfactant.

DETAILED DESCRIPTION OF THE INVENTION

It was unexpectedly found that the combination of carbonyl functional monomers and phosphorous containing monomers in a polymer composition offered a much better chemical resistance than carbonyl functional monomers alone.

The polymers used in the water based coating compositions of this invention are comprised of (a) 0.5 weight percent to 15 weight percent of a carbonyl functionalized monomer, (b) 0.1 weight percent to 10 weight percent of a phosphorous containing monomer, (c) 0.05 weight percent to 5 weight percent of a phosphate surfactant or a polymerizable surfactant and optionally (d) at least a crosslinking agent having two or more hydrazide groups per molecule). The crosslinking agent is optional as it may be added at a later time when a coating composition is formulated from the polymer.

The waterborne coating compositions of this invention are, made with these polymers. Such waterborne coating compositions are comprised of (1) water; (2) an emulsion polymer composition which is comprised of: (a) 0.5 weight percent to 15 weight percent of a carbonyl functionalized monomer, (b) 0.1 weight percent to 10 weight percent of a phosphorous containing monomer, (c) 0.05 weight percent to 5 weight percent of a phosphate surfactant or a polymerizable surfactant; (d) at, least a crosslinking agent having two or more hydrazide groups per molecule); and (3) at least one coalescing aid and optionally. The crosslinking agent is optional as it may be added at a later time when a coating composition is formulated from the polymer.

Suitable phosphate surfactants for use in the present invention include those having at least one phosphate group, as well as salts thereof. Salts include but are not limited to sodium, potassium, lithium, and ammonium salts. Non-limiting examples of phosphate surfactants having at least one phosphate group and salts thereof include the mono- and di-phosphate esters of nonyl phenol ethoxylate, phosphate esters of tridecyl alcohol ethoxylate, phosphate esters of isodecyl ethoxylate, and other phosphate esters of aromatic ethoxylates and aliphatic ethoxylates, phosphate esters of $C_{10}$-$C_{16}$ alkyl ethoxylates/propoxylates and the like; and mixtures thereof. Another class of phosphate group containing surfactants includes phosphate esters of $C_{10}$-$C_{16}$ alkyl ethoxylates/propoxylates wherein the surfactant consists of at least 50% by weight of ethylene oxide and propylene oxide groups and the proportion of ethylene oxide groups and propylene oxide groups is in each case at least 10% by weight, based on the overall amount of the ethylene oxide groups and propylene oxide groups. Such surfactants are described in U.S. Pat. No. 6,348,528, the teachings of which are incorporated herein by reference for the purpose of illustrating phosphate surfactants that are suitable for use in making the Waterborne coating compositions of this invention.

Commercially available phosphate surfactants include those listed in McCutcheon's Emulsifiers and Detergents (2004 edition), such as Rhodafac® PE-510, RE-410, RE-610, RE-960, RK-500A, RS-410, RS-610, RS-610A-25, RS-710, and RS-960 from Rhodia Inc.; Dextrol™ OC-110, OC-15, OC-40, OC-60, and OC-70 from Dexter Chemical L.L.C.; Tryfac® 5553 and 5570 from Cogis Corporation; Klearfac® AA 270, Lutensit® and Maphos® from BASF Corporation; and the like, and mixtures thereof. In one embodiment, Dextrol™ OC-110 (nonyl phenol ethoxylate phosphate ester) from Dexter Chemical L.L.C.) is used. In another embodiment, tridecyl alcohol ethoxylate phosphate ester (Dexttol™ OC-40 from Dexter Chemical L.L.C.) is used.

Non-limiting examples of other suitable phosphates having at least one phosphorus acid group and salts thereof include phosphorous-containing acids (e.g., phosphoric acid, phosphorous acid, hypophosphorous acid, orthophosphoric acid, pyrophosphoric acid, tripolyphosphoric acid, and metaphosphoric acid), monomethyl phosphate, monoethyl phosphate, mono n-butyl phosphate, dimethyl phosphate, diethyl phosphate, ethyl ester of phosphorous acid, and other esters of phosphorous-containing acids; and the like, and mixtures thereof. In one emnbodiment, Dextrol™ OC-70 is used.

A wide variety of polymerizable surfactants can be used in synthesizing the polymers of this invention. These polymerizable surfactants are normally either water-soluble or water-dispersible. U.S. Pat. No. 5,928,783 and U.S. Pat. No. 6,239,240 describe polymerizable surfactants of this type that can be utilized in the polymers of this invention. The teachings of U.S. Pat. No. 5,928,783 and U.S. Pat. No. 6,239,240 are incorporated herein by reference for the purpose of disclosing such polymerizable surfactants that can be employed in the practice of this invention.

The polymerizable surfactants of the invention preferably contain a hydrophilic portion selected from a sulfonate allyl amine moiety, a sulfate allyl amine moiety, or a phosphate allyl amine moiety, and a hydrophobic portion selected from —R, or a group having the formula RO—$(CH_2CH_2O)_n$—; wherein R is an alkyl group or an alkyl-substituted phenyl group wherein the alkyl, group has 1 to 20 carbon atoms, preferably 10 to 18 carbon atoms, and n is an integer from 2 to 100, preferably 2 to 15. The hydrophilic portion and the hydrophobic portion are connected by means of a covalent bond. Combinations of such polymerizable surfactants can be used in preparing the polymers of this invention. Water-soluble or water-dispersible polymerizable surfactants having a terminal allyl amine moieties that are useful in synthesizing the polymers of this invention are available from Stepan Company under the Polystep® trademark. For example, Polystep® NMS-9 surfactant is a preferred polymerizable surfactant for utilization in the practice of this invention.

Numerous water-soluble or water-dispersible polymerizable surfactants having a terminal allyl amine moiety are suitable for use in making the polymers of this invention. For instance, the polymerizable surfactant can be an allyl amine salt of an alkyl benzene sulfonate having the formula 1:

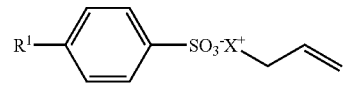

wherein $R^1$ is an alkyl group having 1 to 20 carbon atoms, preferably 10 to 18 carbon atoms, and $X^+$ is selected from $NH_3^+$, $^+NH_2R^4$, or $^+NHR^4R^5$, wherein $R^4$ and $R^5$ are independently selected from $C_1$-$C_4$ alkyl or hydroxyalkyl groups. $X^+$ is preferably $NH_3^+$. An example of a polymerizable surfactant of this type is an allyl amine salt of dodecylbenzene sulfonate.

Another preferred polymerizable surfactant is an allyl amine salt of an alkyl ether sulfate having the formula 2:

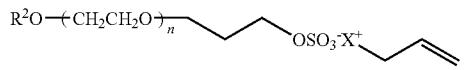

wherein $R_2$ is an alkyl group containing from 1, to 20 carbon atoms, preferably 10 to 18 carbon atoms, n is an integer from 2 to 100, preferably 2 to 15, and $X^+$ is selected from $NH_3^+$, $^+NH_2R^4$, or $^+NHR^4R^5$, wherein $R^4$ and $R^5$ are independently selected from $C_1$-$C_4$ alkyl or hydroxyalkyl groups. $X^+$ is preferably $NH_3^+$. An example of a polymerizable surfactant of this type is an allyl amine salt of lauryl sulfate.

Another preferred polymerizable surfactant is an allyl amine salt of a phosphate ester having the formula 3:

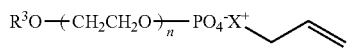

wherein $R^3$ is an alkyl or alkyl-substituted phenyl group wherein the alkyl group has 1 to 20 carbon atoms, n is an integer from 2 to 100, preferably 2 to 15, and $X^+$ is selected from $NH_3^+$, $^+NH_2R^4$, or $^+NHR^4R^5$, wherein $R^4$ and $R^5$ are independently selected from $C_1$-$C_4$ alkyl or hydroxyalkyl groups. It is preferred for $X^+$ to represent $NH_3^+$. An example of a polymerizable surfactant of this type is an allyl amine salt of nonylphenol ethoxylate (9 moles EO) phosphate ester.

Yet another preferred polymerizable surfactant is an allyl amine salt of a sulfate having the formula $R^6$—$SO_3^-$ $X^+$—$CH_2$—$CH$=$CH_2$, wherein $R^6$ is an alkyl group having 6 to 20 carbon atoms, preferably 10 to 18 carbon atoms, and $X^+$ is selected from $NH_3^+$, $^+NH_2R^4$, or $^+NHR^4R^5$, wherein $R^4$ and $R^5$ are independently selected from $C_1$-$C_4$ alkyl or hydroxyalkyl groups. It is preferred for $X^+$ to represent $^+NH_3$.

The substituted phenyl compounds having at least one alkenyl substituent that can be employed as water-soluble or water dispersible polymerizable surfactants in the practice of the subject invention include those disclosed in U.S. Pat. No. 5,332,854. The teachings of U.S. Pat. No. 5,332,854 are incorporated herein by reference for the purpose of disclosing polymerizable surfactants that can be used in the practice of this invention.

Suitable substituted phenyl compounds having at least one alkenyl substituent include compounds having the formula 4:

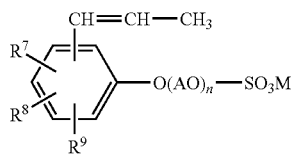

wherein $R^7$ is an alkyl, alkenyl or aralkyl group containing 6 to 18 carbon atoms; $R^8$ is a hydrogen atom or an alkyl, alkenyl or aralkyl group containing 6 to 18 carbon atoms; $R^9$ is a hydrogen atom or a propenyl group; A is an unsubstituted or substituted alkylene group of 2 to 4 carbon atoms; n is an integer of 1 to about 200, preferably 2 to about 100; and M is an alkali metal, an ammonium ion or an alkanolamine residue.

In the substituted phenyl compounds of the invention, the alkyl, alkenyl and aralkyl groups of $R^7$ and $R^8$ are independently selected and may be the same or different. Suitable alkyl groups include, but are not limited to, hexyl, heptyl, octyl, nonyl, decyl, undecyl, dodecyl, tridecyl, tetradecyl, pentadecyl, hexadecyl, heptadecyl and octadecyl. Suitable alkenyl groups include, but are not limited to, hexenyl, heptenyl, octenyl, nonenyl, decenyl, undecenyl, dodecenyl, tridecenyl, tetradecenyl, pentadecenyl, hexadecenyl, heptadecenyl and octadecenyl. Suitable aralkyl groups include, but are not limited to, styryl, benzyl and cumyl.

The propenyl group may occur as trans- and cis-isomers. For the purposes of the present invention, these isomers may be used independently or as a mixture.

For A, suitable unsubstituted or substituted alkylene groups include, for example, ethylene, propylene, butylene, and isobutylene. The polyoxyalkylene group -$(AO)_n$— can be a homopolymer, block polymer or random polymer, or a mixture thereof.

Substituted phenyl surfactants that can be used in the practice of this invention can be produced by adding an alkylene oxide such as ethylene oxide (EO) or propylene oxide (PO) to an alkylated propenyl phenol in the usual manner, sulfating the addict with a sulfating agent such as sulfuric acid, sulfamic acid, chlorosulfonic acid, or the like, followed by neutralizing with an alkaline substance.

A currently preferred group of substituted phenyl compounds are those compounds having the formula 5:

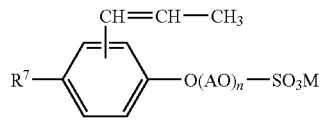

wherein $R^7$, A, M and n are as defined above. More preferred compounds are those wherein $R^7$ represents an alkyl, A is ethylene (—$CH_2CH_2$—), and M is alkali metal or ammonium. Most preferred compounds are those wherein M is ammonium, $R_7$ is nonyl, and n is about 10 to about 30.

The polyoxyalkylene-1-(allyloxymethyl) alkyl ether sulfate salts can be employed in making the polymers of this invention. Suitable polyoxyalkylene-1-(allyloxymethyl) alkyl ether sulfate salts include compounds having the formula 6:

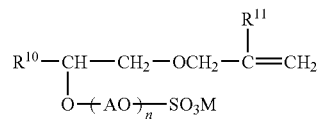

wherein $R^{10}$ is a linear or branched alkyl group containing 8 to 30 carbon atoms, preferably 8 to 14 carbon atoms, and more preferably 10 to 12 carbon atoms; $R^{11}$ is hydrogen or a methyl group, and is preferably hydrogen; A is an unsubstituted or substituted alkylene group having 2 to 4 carbon atoms; n is 0 or an integer of 1 to about 200, preferably 2 to about 100, more preferably 2 to about 30; and M is an alkali metal, an ammonium ion, or an alkanolamine residue. Examples of alkanolamine residues include monoethanolamine, triethanolamine, and the like.

For A, suitable unsubstituted or substituted alkylene groups include, for example, ethylene, propylene, butylene, and isobutylene. The polyoxyalkylene group -$(AO)_n$— can be homopolymers, block polymers, random polymers, or a mixture thereof.

Preferred polyoxyalkylene-1-(allyloxymethyl) alkyl ether sulfate salts that can be used as the polymerizable surfactant in making the polymers of this invention are of the structural formula 7:

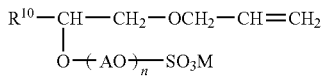

wherein $R^{10}$ is an alkyl group containing 8 to 14 carbon atoms, and preferably 10 to 12 carbon atoms; n is an integer of 1 to about 200, preferably 2 to about 100, more preferably 2 to about 30; and M is an alkali metal, an ammonium ion, or an alkanolamine residue. More preferred compounds are those wherein $R^{10}$ is a decyl or dodecyl group, n is 5 to 10, and M is $NH_4$, such as the compounds available from Dai-Ichi Kogyo Seiyaku Co., Ltd. (Tokyo, Japan) under the trademark Hitenol® KH.

A wide variety of carbonyl functionalized monomers can be utilized in making the polymers of this invention. These carbonyl functionalized monomers possess at least one aldo group or keto group and at least one polymerizable double bond. In other words these monomers are ketone functionalized or aldehyde functionalized ethylenically unsaturated compounds. The carbonyl functionalized monomer will typically contain only one carbon to carbon double bond because multiple carbon to carbon double bonds can lead to undesirably high levels of crosslinking in the polymer.

Some representative examples of carbonyl functionalized monomers that can be used in the practice of this invention include acrolein, diacetone acrylamide, (meth) acryloxyalkyl benzophenone, (meth)acrolein,crotonaldehyde, 2-butanone (meth)acrylate, fommystyrol, vinyl alkyl ketones containing from 4 to 7 carbon atoms (e.g., vinyl methyl ketone, vinyl ethyl ketone, vinyl propyl ketone, and vinyl butyl ketone), diacetone acrylate, acetonyl acrylate, diacetone methacrylate, 2-hydroxypropyl acrylate acetylacetate, 1,4-butanediol acrylate acetylacetate, and (meth)acryloxyalkyl-propenals of the formula 8:

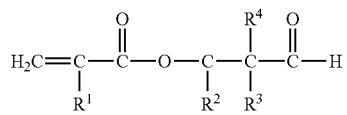

wherein $R^1$ represents a hydrogen atom or a methyl group; $R^2$ represents a hydrogen atom or an alkyl group having from 1 to 3 carbon atoms; $R^3$ represents an alkyl group having from 1 to 3 carbon atoms; and $R^4$ represents an alkyl group having from 1 to 4 carbon atoms. These monomers may be used either individually or in combination with one or more additional carbonyl functionalized monomers. Preferred carbonyl functionalized monomers are diacetone acrylamide, acrolein, and vinyl methyl ketone. Diacetone acrylamide has the structural formula 9:

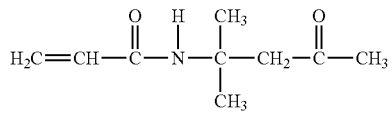

and is commercially available from a variety of sources and is highly preferred from utilization as a monomer in making the polymers of this invention.

The phosphorous containing monomers used in making the polymers of this invention contain a polymerizable double bond and at least one phosphorous atom. The phosphorous containing monomer will preferably be a phosphate ester.

Suitable phosphate esters for use in the practice of the present invention include those represented by the formula 10:

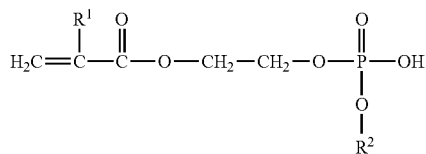

wherein $R^1$ represents a hydrogen atom or a methyl group, and wherein $R^2$ represents a hydrogen atom or a group of the structural formula 1.1:

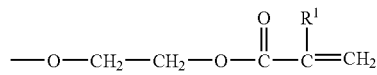

wherein $R^1$ again represents a hydrogen atom or a methyl group. A particularly useful phosphate ester for use in the present invention is hydroxylethyl methacrylate phosphate ester, which is sold under the trademark T-MULZ® 1228 and Sipomer PAM® 4000. The phosphorus containing monomer is different from the phosphate surfactant is that the phosphorus containing monomer has a much smaller hydrophilic group and thus typically is neither water soluble as a monomer nor as a portion of a polymer. The phosphorus containing monomer typically does not have the large poly(alkylene oxide) segments and/or sulfonated groups (strongly hydrophilic groups) of the phosphorus containing surfactant or the polymerizable surfactant. Thus, the phosphorus containing monomer has a different function than phosphate surfactant and/or polymerizable surfactant.

The ethylenically unsaturated monomer or monomers used in synthesizing the polymer of this invention is copolymerizable with the polymerizable surfactant, the carbonyl functionalized monomer and the phosphorous containing monomer utilized in making the polymer of this invention. The ethylenically unsaturated monomer or monomers will also, of course, be copolymerizable under the free radical emulsion polymerizations conditions utilized in synthesizing the polymer of this invention.

Examples of ethylenically unsaturated monomers that can be used in the process of the invention include mono vinyl aromatic monomers, alpha-beta ethylenically-unsaturated carboxylic acid ester monomers, unsaturated monomers with carboxylic acid groups, vinyl ester monomers, and various combinations of these. Preferably they are selected from the group consisting of esters of acrylic and methacrylic acid (e.g., those with 4 to 30 carbon atoms) such as n-butyl (meth) acrylate, methyl(meth)acrylate, ethyl(meth)acrylate, 2-ethyl-hexyl(meth)acrylate, cycloalkyl(meth)acrylates, such as isobornyl(meth)acrylate and cyclohexyl(meth)acrylate, styrene, i.e., styrene or substituted styrenes, for instance alpha-methyl styrene or t-butyl styrene; vinyl toluene; dienes such as 1,3-butadiene or isoprene, and mixtures thereof. Also vinyl esters with 4 to 25 carbon atoms, such as vinyl acetate, vinyl alkanoate or their derivatives or mixtures thereof can be used in the monomer composition. Nitriles, such as (meth)acrylonitrile, or olefinically unsaturated halides, such as vinyl chloride, vinylidene chloride, and vinyl fluoride can also be used. Preferred vinyl ester monomers include vinyl esters of versatic acid such as the monomers commercialized by Hexion Specialty Chemicals under the trade names VEOVA® 9, 10 and 11.

Unsaturated monomers with acid (e.g., carboxylic acid) functionality, which include monomers of which the acid groups are latent as, for example, in maleic anhydride, are suitably selected from, but not limited to: acrylic acid, methacrylic acid, oligomerized acrylic acids such as beta-carboxyethyl acrylate or its higher analogues (commercially available from Rhodia as Sipomerm™ B-CEA), itaconic acid fumaric acid, maleic acid, citraconic acid, or the anhydrides thereof, styrene p-sulphonic acid, ethylmethacrylate-2-sulfonic acid and 2-acrylamido-2-methylpropane sulfonic acid. An acid bearing monomer could be polymerized as the free acid or as a salt, e.g., the $NH_4$ or alkali metal salts. Amide-functional comonomers include, but are not limited to, acrylamide- and methacrylamide. Another component optionally present is repeating units of mono or polycarboxylic acid groups (other than esters of said carboxylic acids). These unsaturated monomers with acid functionality are present in amounts less than 5 wt.% on average based on the weight of said and in another embodiment less than 3 wt. %, and still another embodiment less than 1 wt. % (e.g., acrylic acid, methacrylic acid, crotonic acid, itaconic acid, fumaric or maleic acid, etc.).

Another group of monomers which are useful in preparing the copolymers of the present invention are polar non-ionic monomers such as hydroxyalkyl (meth)acrylates, (meth) acrylamides and substituted (meth)acrylamides, N-vinyl-2-pyrrolidone, N-vinyl caprolactam, 2-hydroxyethyl (meth) acrylate, 2-hydroxypropyl (meth)acrylate, 4-hydroxybutyl (meth)acrylate, (4-hydroxymethylcyclohexyl)-methyl (meth)acrylate, 1-(2-((2-hydroxy-3-(2-propenyloxy)propyl) amino)ethyl)-2-imidazolidinone, N-methylol (meth)acrylamide, Sipomer® WAM, WAM II (from Rhodia) and other urido-containing monomers, dimethylaminoethyl (meth) acrylate, and dimethylaminopropyl (meth)acrylamide. Mixtures of polar monomers also may be used. Those hydrophilic monomers should be used at appropriate levels, which do not impair the earlier water resistance.

Vinyl aromatic monomers can also be employed as the copolymerizable monomer. However, the total amount of vinyl aromatic monomers utilized in making the polymer of this invention will typically not exceed about 25 weight percent of the total weight of monomers employed in making the polymer in the case of polymers that are employed in exterior coatings. This is because polymers that contain more than about 25 weight percent vinyl aromatic monomers are prone to yellowing and chalking on exposure to ultraviolet light. It is generally preferred for polymers that are employed in exterior coating applications to contain less than 10 or 20 weight percent vinyl aromatic monomer.

The polymerizable surfactant will be incorporated into the polymers of this invention at a level which is within the range of 0.05 weight percent to 5 or 8 weight percent, based upon the total weight of the polymer. The polymerizable surfactant will more typically be incorporated into the polymers of this invention at a level which is within the range of 0.1 weight percent to 5 weight percent and will preferable be incorporated into the polymers of this invention at a level which is within the range of 0.2, 0.3 or 0.5 weight percent to 2 weight percent.

The carbonyl functionalized monomer will be incorporated into the polymers of this invention at a level which is within the range of 0.5 weight percent to 15 or 20 weight percent, based upon the total weight of the polymer. The carbonyl functionalized monomer will more typically be incorporated into the polymers of this invention at a level which is within the range of 2 weight percent to 12 weight percent and will preferable be incorporated into the polymers of this invention at a level which is within the range of 2 weight percent to 8 weight percent.

The phosphorous containing monomer will be incorporated into the polymers of this invention at a level which is within the range of 0.1 weight percent to 10 weight percent, based upon the total weight of the polymer. The phosphorous containing monomer will more typically be incorporated into the polymers of this invention at a level which is within the range of 0.2 or 0.3 weight percent to 5 weight percent and will preferable be incorporated into the polymers of this invention at a level which is within the range of 0.2 or 0.5 weight percent to 2.5 weight percent.

In addition to the polymerizable surfactant, the carbonyl functionalized monomer, and the phosphorous containing monomer the balance of the polymers of this invention will be comprised of the ethylenically unsaturated polymerizable monomers. Thus, in one embodiment, the emulsion polymer(s) of this invention will contain at least 38 weight percent of the additional ethylenically monomers. More specifically, the emulsion polymer will be comprised of 0.05 to 5 or 8 weight percent of the polymerizable surfactant, 0.5 weight percent to 15 or 20 weight percent of the carbonyl functionalized monomer, 0.1, 0.5, or 2 to 8, 10, 12 or 15 weight percent of the phosphorous containing monomer, and about 30, 38 or 70 to 98.8, 98.9, or 99.35 weight percent of at least one ethylenically unsaturated monomer.

In many cases, it is advantageous to utilize both an alkyl acrylate monomer and an alkyl methacrylate monomer is making the polymers of this invention. For instance, in one embodiment, the polymer can advantageously be comprised of about 20, 30, or 40 to 80 weight percent of a alkyl methacrylate monomer, 15 to 30, 40 or 50 weight percent of an alkyl acrylate monomer, 4 weight percent to 8 weight percent of a carbonyl functionalized monomer, 1 weight percent to 3 weight percent of a phosphorous containing monomer, and 0.2 weight percent to 1 weight percent of a polymerizable surfactant. In one embodiment, the alkyl acrylate monomer can be methyl methacrylate, the alkyl acrylate monomer can be 2-ethyl hexyl acrylate, the carbonyl functionalized monomer can be diacetone acrylamide, and the phosphorous containing monomer can be hydroxy ethyl methacrylate phosphate ester. Alternative ranges and monomers can be used in alternative embodiments. It is frequently desirable to include a small amount of methacrylic acid in polymers of this type. For example, it may be desirable to include from about 0.1 weight percent to about 5 weight percent methacrylic acid or other carboxylic acid containing ethylenically unsaturated monomers in polymers of this type. It is typically more desirable to include from about 0.2 weight percent to about 1 weight percent carboxylic acid containing ethylenically unsaturated monomers in polymers of this type.

Beside surfactants described above, other surfactants also may be used as co-surfactants in emulsion polymerization. These co-surfactants include anionic or nonionic emulsifiers and mixtures thereof. Typical anionic emulsifiers include alkali or ammonium alkyl sulfates, alkyl sulfonates, salts of fatty acids, esters of sulfosuccinic acid salts, alkyl diphenylether disulfonates, and the like, and mixtures thereof. Typical nonionic emulsifiers include polyethers, e.g., ethylene oxide and propylene oxide condensates, including straight and branched chain alkyl and alkylaryl polyethylene glycol and polypropylene glycol ethers and thioethers, alkyl phenoxypoly(ethyleneoxy)ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides; and the like, and mixtures thereof. Co-surfactants typically are employed in the compositions of the present invention at levels of about 0 wt. % to about 3 wt. % High concentration of co-surfactant may adversely affect early water bushing or whitening resistance.

The emulsion polymerization employed in synthesizing the polymer of this invention is carried out in a conventional manner using well-known additives and ingredients; such as emulsifiers, free radical polymerization initiators, and the like, and mixtures thereof. Either thermal or redox initiation processes may be used. The reaction temperature typically is maintained at a temperature lower than about 100° C. throughout the course of the reaction. In one embodiment, a reaction temperature between about 50° C. and 95° C. is used.

For the purpose of adjusting pH at the outset of the polymerization pH control agents and buffers typically are added. The initial reactor pH will normally be within the range of about 3 to about 10. However, other pH values may be obtained in particular applications using pH control agents and buffers well known to those skilled in the art. Non-limiting examples of suitable pH control agents include but are not limited to ammonium and alkali metal hydroxides (such as sodium hydroxide and potassium hydroxide), and mixtures thereof, and the like. Non-limiting examples of suitable buffers include ammonium carbonate, sodium carbonate, sodium bicarbonate, and mixtures thereof, and the like. pH may be adjusted if desired at the end of the polymerization process according to the desired application.

In preparing the copolymer component, any chain-transfer agent, or mixtures thereof, may be used to control molecular weight. Suitable chain transfer agents include, for example, $C_1$ to $C_{12}$ alkyl or functional alkyl mercaptans, alkyl or functional alkyl mercaptoalkanoates, or halogenated hydrocarbons, and the like, and mixtures thereof. Chain transfer agents typically are employed at levels of about 0.1 weight percent to about 10 weight percent, based on total monomer weight.

The copolymers typically are prepared in the presence of water-soluble or oil-soluble initiators (such as persulfates, peroxides, hydroperoxides, percarbonates, peracetates, perbenzoates, azo-functional compounds, and other free-radical generating species, and the like, and mixtures thereof, as is well known to those skilled in the art.

Any nitrogen-containing compound having at least two amine nitrogens reactive with carbonyl groups may be employed as a crosslinking agent in the practice of the present invention. The crosslinker may be added during the polymerization process or post-added during formulation of the coating compositions. Such crosslinking agents may be aliphatic or aromatic, polymeric or non-polyineric, and may be used alone or in combination. Non-limiting examples of suitable compounds include: hydrazine, aliphatic dihydrazines having from 2 to 4 carbon atoms such as but not limited to ethylene-1,2-dihydrazine, propylene-1,3-dihydrazine, and butylene-1,4-dihydrazine, alkylene dioxime ethers, and water soluble dihydrizides of dicarboxylic acids (for example, dihydrizides of malonic, succinic, and adipic acids). In one embodiment, the dihydrazide of adipic acid (adipic acid dihydrazide) is used.

In one embodiment, the crosslinking agent is used in an amount sufficient to react with about 0.25 to about 1 carbonyl mole equivalents present in the copolymer. In another embodiment, the crosslinking agent is used in an amount sufficient to react with at least about 0.5 to about 1 carbonyl mole equivalents (derived from the carbonyl functional monomer) present in the copolymer.

In this invention, the glass transition temperature ("Tg") of the emulsion copolymer should be maintained below about 90° C. Tg's used herein are those calculated by using the Fox equation; see T. G. Fox, Bull. Am. Physics Soc., Volume 1, Issue No. 3, page 123, (1956). In other words, for calculating the Tg of a copolymer of monomers M1 and M2, $1/Tg(calc.)=w(M1)/Tg(M1)+w(M2)/Tg(M2)$, wherein Tg(calc.) is the glass transition temperature calculated for the copolymer, w(M1) is the weight fraction of monomer M1 in the copolymer, w(M2) is the weight fraction of monomer M2 in the copolymer, Tg(M1) is the glass transition temperature of the homopolymer of M1, and Tg(M2) is the glass transition temperature of the homopolymer of M2, with all temperatures being in ° K. Glass transition temperatures of homopolymers may be found, for example, in J. Brandrup and E. H. Immergut, ed., Polymer Handbook, Interscience Publishers.

When the emulsion polymers were made by various processes to create core-shell or non-uniform monomer distribution in the particles or multi-modal particle distribution or other morphology, the Tg calculation is based on the total monomers used in the polymerization, regardless of the sequence of monomer additions.

The latex formed by the free radical emulsion polymerization can optionally be diluted with additional water to any concentration (solids content) that is desired. This latex can then be used in the preparation of water based coatings-employing techniques that are well-known to those skilled in the art.

Desired pigments, plasticizers, coalescing solvents, fillers, wetting agents, stabilizers, defoamers, dryers, antibacterial agents, fungicides, insecticides, antifouling agents, and anti-corrosive agents can be mixed directly into the latex.

Pigments are normally added to paint formulations to impart color and hiding to the coating. Titanium dioxide is an example of a widely used pigment which imparts hiding and a white color. Mineral pigments (such as oxides of iron and chromium), organic pigments (such as phthalocyanine) and active anticorrosive pigments (such as zinc phosphate) are representative examples of other widely used pigments.

The fillers employed in making water based coating formulations are normally inexpensive materials which are added to attain the desired consistency and non-settling characteristics. Fillers can also improve a coating's physical properties, such as resistance to cracking and abrasion. Some representative examples of widely utilized fillers include chalks, clays, micas, barites, talcs, and silica.

Fungicides and algaecides are commonly added to interior and exterior house paints and are of particular value in coating formulations that will be used in warm climates. Antifouling compounds are commonly added to marine-paints to inhibit marine growth.

A film-forming, water based composition can be prepared utilizing a mixture of the polymer with suitable coalescing solvent and plasticizer. It is preferred for the coalescing solvent to be at least water inmiscible and even more preferably for it to be water insoluble. Of the various solvents which can be used, generally ethylene glycol monobutyl ether, ethylene glycol monoethyl ether, diethylene glycol monomethyl ether, diethylene glycol monoethyl ether, diethylene glycol monobutyl ether, propylene glycol monobutyl ether, propylene glycol monoethyl ether, dipropylene glycol monomethyl ether, dipropylene glycol monoethyl ether, dipropylene glycol monobutyl ether are preferred. It should be noted that the solvent and plasticizer can be mixed directly with the polymer in its water emulsion. In one embodiment, the coalescing solvent (aid) is present in an amount from about 2 to about 20 weight percent based on the total weight of the polymer. In another embodiment, it is present from about 3 to about 15 weight percent.

A wide variety of plasticizers can be used in the practice of this invention. They can, for example, be of the type listed in the Federation Series on Coatings Technology, Unit Twenty-two, entitled "Plasticizers," published April, 1974, so long as they fulfill the melting point, boiling point and compatibility requirements. Some representative examples of plasticizers that can be used include propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, propylene glycol n-butyl ether, dipropylene glycol n-butyl ether, tripropylene glycol n-butyl ether, propylene glycol phenyl ether, propylene glycol diacetate, dipropylene glycol dimethyl ether, diethylene glycol ethyl ether, diethylene glycol methyl ether, diethylene glycol n-butyl ether, diethylene glycol hexyl ether, diethylene glycol n-butyl ether acetate, ethylene glycol propyl ether, ethylene glycol n-butyl ether, ethylene glycol hexyl ether, ethylene glycol n-butyl ether acetate, triethylene glycol methyl ether, triethylene glycol ethyl ether, triethylene glycol n-butyl ether, ethylene glycol phenyl ether, ethylene glycol n-butyl ether mixture, polyethylene glycol dibenzoate, o-p-toluene sulfonamide, trimethylpentanediol dibenzoate and trimethylpentanediol monoisobutyrate monobenzoate.

In making a water based coating compositions of this invention, typically about 25 parts by weight to about 100 parts by weight of the polymer is incorporated into 100 parts by weight of water. However, more or less water can usually be employed. Level of polymer utilized will also depend upon the type and amount of coalescing solvent and plasticizer used. The water based coating composition, as an aqueous dispersion or solution, can then be applied as a coating onto a suitable substrate such as wood, masonry, plastic or metals. As has been explained, the water based coating compositions of this invention are a particular value for application to masonry surfaces, such as garage floors and concrete driveways.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

An emulsion polymer of methacrylic acid, methyl methacrylate, 2-ethylhexyl acrylate, diacetone acrylamide and T-mulz1228 phosphate monomer was made by using Polystep® NMS-9 (a polymerizable phosphate surfactant). A monomer premix was made by mixing 216 grams of water, 45.6 grams of diacetone acrylamide, 0.8 grams of ammonium carbonate, 19.2 grams of Polystep® NMS-9, 4.57 grams of ammonium hydroxide, 13.6 grams of T-Mulz 1228 with 16 grams of water flush, 4 grams of methacrylic acid, 280 grams of methyl methacrylate, 280 grams of 2-ethylhexyl acrylate. Initiator A was made by dissolving 0.8 grams of ammonium persulfate in 13.3 grams of water. Initiator B was made by dissolving 1.2 grams of ammonium, persulfate in 80 grams of water. A 3-liter reaction vessel was charged as follows: 568 grams of water, 0.72 grams of ammonium carbonate, and 6.86 grams of Calfax® 16-L35 grams, and then was heated to 88° C. under nitrogen. Initiator A was then added to the reaction vessel, followed by proportioning the monomer premix to the reaction vessel over a period of about 3 hours. At 45 minutes after premix proportioning started, initiator B was proportioned into the reaction vessel over a period of about 3 hours and 30 minutes. At 75 minutes after premix proportioning started, the premix proportioning was stopped for 15 minutes. 176 grams of methyl methacrylate was added the remaining monomer premix and 6.86 grams of Calfax® 16 L-35 was added into the reactor. After completion of initiator B feed, the temperature of the reaction vessel was maintained at 88° C. for 30 minutes. The reaction vessel then was cooled to 57° C. A mixture of 10.64 grams of water, 0.91 grams of t-butyl hydroperoxide, and 0.27 grams of 30% ammonium lauryl was added to the reaction vessel. After about 5 minutes, 23.2 grams of 2.4% erythorbic acid was added to the reaction vessel. After 30 minutes, the reaction vessel was cooled to room temperature and filtered through 100-micron cloth. Then, 128 grams of 12.8% adipic acid dihydrazide, ammonium hydroxide, and biocide were added. The product had a pH about 8.5.

EXAMPLE 2

The emulsion polymer was made exactly the same as Example 1 except that 240.8 grams of methyl methacrylate and 256 grams of 2-ethylhexyl acrylate were used in the monomer premix, 240 grams of methyl methacrylate was added in the remaining monomer premix, and 6.86 grams of Calfax® 16 L-35 was added into the reactor at 75 minute stop. All, other monomers were the same.

EXAMPLE 3

The emulsion polymer was made exactly same as Example 2 except 4.8 grains of Dextrol™ OC-70 phosphate ester of tridecyl alcohol ethoxylate was used instead of Polystep® NMS-9.

EXAMPLE 4

The emulsion polymer was made exactly same as Example 1 except that 13.6 grams of Sipomer™ PAM-4000 phosphate monomer (instead of T-mulz 1228 monomer), 224.8 grams of methyl methacrylate and 272 grams of 2-ethylhexyl acrylate were used in the monomer premix. All other monomers were the same.

EXAMPLE 5

An emulsion polymer of metliacrylic acid, methyl methacrylate, 2-ethylhexyl acrylate, styrene, diacetone acrylamide and Sipomemm PAM-4000 phosphate monomer was made by using Polystep® NMS-9 polymerizable phosphate surfactant. A monomer premix was made by mixing 432 grams of water, 91.2 grams of diacetone acrylamide, 2.4 grams of ammonium carbonate, 38.4 grams of Polystep® NMS-9, 27.2 grams of Sipomer™ PAM-4000 with 32 grams of water flush, 9.14 grams of ammonium-hydroxide, 8 grams of methacrylic acid, 81.6 grams of methyl methacrylate, 400 grams of styrene, 5.12 grams of 2-ethylhexyl acrylate. Initiator A was made by dissolving 2.24 grams of ammonium persulfate in 26.6 grams of water. Initiator B was made by dissolving 2.4 grams of ammonium persulfate in 160 grams of water. A 5-liter reaction vessel was charged as follows: 1136 grams of water, 1.44 grams of ammonium carbonate, and 9.14 grams of Calfax® 16-L35 grams, and then was heated to 84° C. under nitrogen. Initiator A was then added to the reaction vessel, followed by proportioning the monomer premix to the reaction vessel over a period of about 3 hours. The reaction was kept at 88° C. At 45 minutes after premix proportioning started, initiator B was proportioned into the reaction vessel over a period of about 3 hours and 30 minutes. At 70 minutes after premix proportioning was started, the premix proportioning was stopped for 15 minutes. Then, 480 grams of methyl methacrylate was added the remaining monomer premix and 13.71 grams of Calfax® 16 L-35 was added into the reactor. After completion of initiator B feed, the temperature of the reaction vessel was maintained at 88° C. for 30 minutes. The reaction vessel then was cooled to 57° C. A mixture of 21.28 grams of water, 1.83 grams of t-butyl hydroperoxide, and 0.53 grams of 30% ammonium lauryl was added to the reaction vessel. After about 5 minutes, 46.4 grams of 2.4% erythorbic acid was added to the reaction vessel. After 30 minutes, the reaction vessel was cooled to room temperature and filtered through 100-micron cloth. Then, 256 grams of 12.8% adipic acid dihydrazide, ammonium hydroxide, and biocide were added. The product had a pH about 8.5.

EXAMPLE 6

In this experiment, the emulsion polymer was made utilizing the same procedure as in Example 2 except Polystep® NMS-9 was replaced by 4.8 grams of Adeka™ SR-10 polymerizable surfactant.

EXAMPLE 7

In this experiment, the emulsion polymer was made using the same procedure as in Example 2 except that the Polystep® NMS-9 was replaced by 4.8 grams of Hetenol™ KH-10 polymerizable surfactant.

COMPARATIVE EXAMPLE 1

In this experiment, the emulsion polymer was made using exactly same procedure as were employed in Example 2 except that the T-multz was replaced with methacrylic acid.

COMPARATIVE EXAMPLE 2

In this experiment, the emulsion polymer was made utilizing the same procedure as in Example 2 except that T-multz was replaced by AMPS™ 2405 monomer at same solids basis.

COMPARATIVE EXAMPLE 3

In this comparative experiment, an emulsion polymer was synthesized using the same procedure that was employed in Example 2 except that Polystep® NMS-9 was replaced by Disponil™ AES-25 nonyl phenol ethoxylated sulfate at same solids basis.

COMPARATIVE EXAMPLE 4

In this experiment, an emulsion polymer was made by the same technique that was utilized in Example 2 except that Polystepg NMS-9 was replaced by 6.86 grams of Calfax® 16L-35 and 8 grams of sodiuin laureth sulfate.

COMPARATIVE EXAMPLE 5

In this experiment, an emulsion polymer was made using the same procedure that was employed in Example 2 except that Polystep® NMS-9 was replaced by 686 grams of Calfax® 16L-35 and 3.43 grams of Aerosol™ TR-70.

COMPARATIVE EXAMPLE 6

In this experiment, an emulsion polymer was synthesized by the same technique that was use in Example 2 except that Polystep® NMS-9 was replaced by 8 grams of Rhoplex™ ES-30 sodium trideceth sulfate.

The data from Examples 1-7 and Comparative Examples 1-6 is summarized below in Table 0.1. In Comparative Examples 1 and 2, no phosphate monomer was incorporated into the polymer. In Comparative Examples 3-6, no polymerizable monomer or phosphate surfactant was incorporated into the polymer.

TABLE 1

Experimental Polymers Formulated in Clear Coatings Comparative Study

| Example # | Additive 1 | Additive 2 | Early Blush Resistance | Brake Fluid Resistance | % of Total |
|---|---|---|---|---|---|
| Example 1 | NMS-9 | T-mulz 1228 | 10 | 8 | 90 |
| Example 2 | NMS-9 | T-mulz 1228 | 10 | 8 | 90 |
| Example 3 | OC-70 | T-mulz 1228 | 10 | 8 | 90 |
| Example 4 | NMS-9 | PAM-4000 | 10 | 8 | 90 |
| Example 5 | NMS-9 | PAM-4000 | 10 | 9 | 95 |
| Example 6 | Adeka ™ SR-10 | T-mulz 1228 | 6 | 8 | 70 |
| Example 7 | Hetenol ™ KH-10 | T-mulz 1228 | 10 | 8 | 90 |
| Comparative | | | | | |
| Example #1 | NMS-9 | MAA | 0 | 0 | 0 |
| Example #2 | NMS-9 | AMPS-2405 | 6 | 0 | 30 |
| Example #3 | Disponil ™ AES-25 | T-mulz 1228 | 10 | 0 | 50 |
| Example #4 | Calfax ™ & ALS | T-mulz 1228 | 0 | 6 | 30 |
| Example #5 | Calfax ™ & TR-70 | T-mulz 1228 | 6 | 6 | 60 |

Note:
Early blush resistance was reported on a 0-10 scale where 10 is excellent and 0 is indicative of total failure. Brake fluid resistance is also reported on a 0-10 scale where 10 is excellent and 0 is indicative of total failure.

As can be seen by reviewing the data in Table 1, the experimental polymers made in accordance with this invention offered generally better early blush resistance and resistance to brake fluid than did the polymers made in the Comparative Examples using conventional technology.

Paint Examples

In this series of experiments, the latex of the polymer synthesized in Example 2 and a number of commercially available lattices were formulated into clear waterborne coating compositions for application to horizontal masonry substrates. The coatings made with these formulations were evaluated for early water resistance, blushing on concrete, adhesion, and chemical resistance. These characteristics were evaluated utilizing the following test procedures:

1) Early Water Resistance
   Apply 1 coat on black Leneta scrub chart; dry at room temperature for 2 hours.
   Immerse ½ of the chart in a water bath for 24 hours.
   Remove chart from water batch and rate for degree of blushing, blistering and other film deformation after removing from water immediately and after 24 hour recovery at room temperature.
   Rating scale is 1-10 (10 is best).
2) Blushing on Concrete
   Apply 2 coats on Type 1 smooth concrete; dry film for 24 hours at room temperature.
   Apply a cotton (absorbent) pad to the surface of the coated concrete.
   Soak the cotton pad with water. Leave wet cotton pad on the coated concrete for 24 hours.
   Remove the cotton pad, rate for degree of blushing and recovery immediately after removing the cotton pad and after recovery for 24 hours.
   Rating scale is 1-10 (10 is best).
3) Adhesion
   Apply 1 or 2 coats on Type 1, smooth concrete; dry at room temperature for 24 hours.

Using a cross-hatch template and very sharp utility knife, cut through the film in a 10×10 grid pattern.
Firmly apply Permacel™ tape to the grid area; then remove tape in a quick motion at 90° from the surface.
To a second 10×10 grid, apply a cotton pad and completely saturate with water.
Remove cotton pad after 30 minutes.
Gently pat the wet area to dry it off; after 5 minutes, apply the Tm tape and repeat tape pull as noted above.
Rate the following rating scale is 0-5 (5 is Excellent, no film removed).

4) Chemical Resistance

Apply 2 coats on Type 1, smooth concrete, dry for 3 days at room temperature.
Place a cotton pad on the surface; saturate with one of the following products; dirty motor oil, brake fluid, windshield washing fluid, transmission fluid, Skydrol™, antifreeze, bleach, pool chlorine, TSP and other similar materials.
Allow the wet pad to come in direct contact with the film surface for 1 hour.
Remove wet pad and rate for degree of film defect.
Rating scale is 1-10 (10=Excellent)

The coating compositions made in this series of experiments were formulated utilizing the ingredients identified in Table 2. In making these coating formulations, the ingredients identified in Table 2 were added to a mixing vessel sequentially in the order listed under continuous agitation. Ammonia was added immediately after the addition of the polymer latex in a quantity which was sufficient to adjust the pH of the formulation to 9.

TABLE 2

Clear - Horizontal Masonry Coating 100 g/l VOC

| | Weight % |
|---|---|
| Water | 36.7 |
| Surfynol ® 104H surfactant[1] | 0.9 |
| BYK ® 333 polyether modified polydimethylsiloxane | 0.1 |
| Dowanol ® DPnB dipropylene glycol monobutyl ether | 2.7 |
| Polymer emulsion | 59.1 |
| Ammonia (pH = 9) | 0.1 |
| Acrysol ® RM 825 polyurethane associative thickener | 0.4 |
| Total | 100 |

[1]Surfynol ® 104H surfactant is a mixture containing 75 weight percent of 2,4,7,9-tetramethyl-5-decyne-4,7-diol (CAS Number 126-86-3) and 25 weight percent of ethylene glycol.

The identity of the polymer latex utilized in making each of the formulations in this series of experiments is identified in the following tables as are the physical and chemical characteristics of the coatings made.

TABLE 3

| | Experimental Polymer | Commercial Polymers for Masonry or Concrete | | | |
|---|---|---|---|---|---|
| | from Example 2 | Polymer 1 | Polymer 2 | Polymer 3 | Polymer 4 |
| Early Blush Resistance (10 = Excellent) | | | | | |
| Blush | 10 | 0 | 5 | 0 | 5 |
| Recovery | 10 | 5 | 0 | 0 | 10 |
| Adhesion (10 = excellent) | | | | | |
| Dry Tape Pull | 10 | 10 | 10 | 8 | 10 |
| Chemical Resistance (10 = Excellent) | | | | | |
| Dirty Motor Oil | 10 | 9 | 9 | 9 | 9 |
| Brake Fluid | 9 | 0 | 0 | 6 | 9 |
| Winshield Washer Fluid | 10 | 8 | 8 | 10 | 10 |
| TSP | 10 | 9 | 10 | 10 | 5 |
| Skydrol ™ | 10 | 5 | 5 | 6 | 6 |
| Ethylene Glycol | 10 | 8 | 10 | 10 | 6 |
| Overall Rating | 89 | 54 | 57 | 59 | 70 |

TABLE 4

| | Paint from | Commercial Paints for Masonry or Concrete | | | | | |
|---|---|---|---|---|---|---|---|
| | Polymer of Example 2 | Paint A | Paint B | Paint C | Paint D | Paint E | Paint F |
| Early Blush Resistance (10 = Excellent) | | | | | | | |
| Blushing | 10 | 2 | 8 | 10 | 0 | 2 | 1 |
| Recovery | 10 | 2 | 10 | 10 | 0 | 2 | 1 |
| Adhesion (10 = Excellent) | | | | | | | |
| Dry Tape Pull | 10 | 10 | 10 | 10 | 2 | 8 | 6 |
| Chemical Resistance (10 = Excellent) | | | | | | | |
| Dirty Motor Oil | 10 | 9 | 8 | 8 | 9 | 10 | 10 |
| Brake Fluid | 9 | 1 | 0 | 0 | 0 | 1 | 0 |
| Winshield Washer Fluid | 10 | 9 | 9 | 8 | 9 | 10 | 8 |

TABLE 4-continued

| | Paint from | Commercial Paints for Masonry or Concrete | | | | | |
|---|---|---|---|---|---|---|---|
| | Polymer of Example 2 | Paint A | Paint B | Paint C | Paint D | Paint E | Paint F |
| TSP | 10 | 5 | 9 | 10 | 10 | 10 | 0 |
| Skydrol ™ | 10 | 1 | 0 | 0 | 0 | 1 | 0 |
| Ethylene Glycol | 10 | 10 | 10 | 10 | 10 | 10 | 9 |
| Overall Rating | 89 | 49 | 64 | 66 | 40 | 54 | 35 |

As can be seen from the Tables above, the experimental latex of this invention provided coating formulations that had a unique combination of early blush resistance as well as excellent resistance to household chemicals. These coating compositions also exhibited outstanding adhesion characteristics to masonry substrates. Accordingly, these coating formulations offer an excellent combination of characteristics for application to horizontal concrete substrates.

While certain representative embodiments and details have been shown for the purpose of illustrating the subject invention, it will be apparent to those skilled in this art that various changes and modifications can be made therein without departing from the scope of the subject invention.

What is claimed is:

1. A waterborne coating composition which is comprised of (1) water; (2) an emulsion polymer composition which is comprised of: (a) 0.5 weight percent to 15 weight percent of a carbonyl functionalized monomer, (b) 0.1 weight percent to 10 weight percent of a phosphorous containing monomer, (c) at least one ethylenically unsaturated monomer, and (d) 0.05 weight percent to 5 weight percent of a polymerizable surfactant having a terminal allyl amine moiety and (3) at least one coalescing aid.

2. A water based coating composition, as specified in claim 1, wherein the ethylenically unsaturated monomer is selected from the group consisting of vinyl aromatic monomers, acrylate monomers, and alkyl acrylate monomers and wherein said polymerizable surfactant having a terminal allyl amine moiety comprises a hydrophilic portion selected from the group consisting of sulfonate allyl amine, sulfate allyl amine or phosphate allyl amine.

3. A waterborne coating composition, as specified in claim 1, wherein said carbonyl functionalized monomer has at least one carbonyl group capable of reacting with a dihydrazide during film formation and one polymerizable double bond and wherein said composition further comprises at least one crosslinking agent having two or more hydrazide groups per molecule.

4. An emulsion polymer which is comprised of: (a) 0.05 weight percent to 8 weight percent of a polymerizable surfactant having a terminal allyl amine moiety, (b) 0.5 weight percent to 20 weight percent of a carbonyl functionalized monomer, (c) 0.1 weight percent to 10 weight percent of a phosphorous containing monomer, and (d) at least one ethylenically unsaturated monomer.

5. An emulsion polymer, as specified in claim 4, wherein the ethylenically unsaturated monomer is present in an amount from about 70 to about 99.3 wt. % of said repeating units in said emulsion polymer and is selected from the group consisting of vinyl aromatic monomers, acrylate monomers, and alkyl acrylate monomers.

6. An emulsion polymer, as specified in claim 4, wherein the carbonyl functionalized monomer has at least one carbonyl group capable of reacting with a dihydrazide during film formation and one polymerizable double bond and wherein said composition further comprises at least one crosslinking agent having two or more hydrazide groups per molecule.

7. An emulsion polymer, as specified in claim 4, wherein the carbonyl functionalized monomer is selected from the group consisting of acrolein, diacetone acrylamide, (meth) acryloxyalkyl benzophenone, (meth) acrolein, crotonaldehyde, 2-butanone(meth)acrylate, formylstyrol, vinyl alkyl ketones containing from 4 to 7 carbon atoms, diacetone acrylate, acetonyl acrylate, diacetone methacrylate, 2-hydroxypropyl acrylate acetylacetate, 1,4-butanediol acrylate acetylacetate, and (meth)acryloxyalkyl-propenals of the formula:

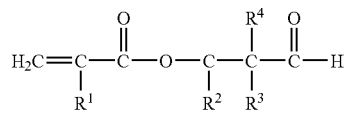

wherein $R^1$ represents a hydrogen atom or a methyl group; $R^2$ represents a hydrogen atom or an alkyl group having from 1 to 3 carbon atoms; $R^3$ represents an alkyl group having from 1 to 3 carbon atoms; and $R^4$ represents an alkyl group having from 1 to 4 carbon atoms.

8. An emulsion polymer, as specified in claim 4, wherein the phosphorous containing monomer contains at least one phosphorous atom and a polymerizable double bond.

9. An emulsion polymer, as specified in claim 4, wherein the phosphorous containing monomer is of the structural formula:

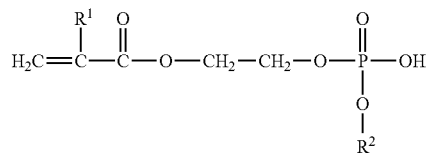

wherein $R^1$ of said structural formula represents a hydrogen atom or a methyl group, and wherein $R^2$ represents a hydrogen atom or a group of the structural formula:

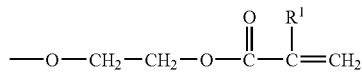

wherein $R^1$ represents a hydrogen atom or a methyl group.

10. An emulsion polymer, as specified in claim 4, wherein the polymerizable surfactant is present at a level of 0.1 weight percent to 5 weight percent and comprises a hydrophilic portion selected from the group consisting of sulfonate allyl amine, sulfate allyl amine or phosphate allyl amine, wherein the carbonyl functionalized monomer is present at a level of 2 weight percent to 12 weight percent, and wherein the a phosphorous containing monomer is present at a level of 0.3 weight percent to 5 weight percent.

11. An emulsion polymer, as specified in claim 4, wherein the additional polymerizable monomer comprises an alkyl methacrylate monomer.

12. An emulsion polymer, as specified in claim 11, wherein vinyl aromatic monomers are present in the polymer at a level of less than 10 weight percent.

13. An emulsion polymer, as specified in claim 12, wherein the polymer is further comprised of an alkyl acrylate monomer.

14. An emulsion polymer, as specified in claim 13, wherein the polymerizable surfactant is present at a level of 0.5 weight percent to 2 weight percent, wherein the carbonyl functionalized monomer is present at a level of 4 weight percent to 8 weight percent, and wherein the a phosphorous containing monomer is present at a level of 0.5 weight percent to 2.5 weight percent.

15. An emulsion polymer, as specified in claim 14, wherein the alkyl methacrylate monomer is present at a level which is within the range of 40 weight percent to 80 weight percent and wherein the alkyl acrylate monomer is present at a level which is within the range of 15 weight percent to 50 weight percent.

16. An emulsion polymer, as specified in claim 15, wherein the alkyl methacrylate monomer is methyl methacrylate and wherein the alkyl acrylate is 2-ethyl hexyl acrylate.

17. An emulsion polymer, as specified in claim 16, wherein the carbonyl functionalized monomer is diacetone acrylamide, and wherein the phosphorous containing monomer is hydroxyl ethyl methacrylate phosphate ester.

18. An emulsion polymer, as specified in claim 4, wherein the polymer is made with a multi-stage process and the polymer has a minimum film formation temperature which is within the range of 10° C. to 40° C.

* * * * *